United States Patent [19]

Kyohya

[11] Patent Number: 4,807,219
[45] Date of Patent: Feb. 21, 1989

[54] OPTICAL PICKUP FEED UNIT OF OPTICAL DISK PLAYER

[75] Inventor: Shoichi Kyohya, Kakuda, Japan

[73] Assignee: Alps Electric Co., Ltd., Japan

[21] Appl. No.: 5,752

[22] Filed: Jan. 21, 1987

[30] Foreign Application Priority Data

Mar. 25, 1986 [JP] Japan ............................ 61-44139[U]

[51] Int. Cl.⁴ ........................ G11B 3/10; G11B 17/06
[52] U.S. Cl. .................................... 369/220; 369/249
[58] Field of Search ............... 369/219, 220, 249, 215, 369/244

[56] References Cited

U.S. PATENT DOCUMENTS

| | | | |
|---|---|---|---|
| 3,622,163 | 11/1971 | Bachman | 369/220 |
| 3,954,272 | 5/1976 | Leedon | 369/249 |
| 4,507,771 | 3/1985 | Tanaka | 369/219 |
| 4,514,837 | 4/1985 | Van Rosmaler | 369/219 |
| 4,620,301 | 10/1986 | Koide | 369/219 |

Primary Examiner—Steven L. Stephan
Attorney, Agent, or Firm—Guy W. Shoup; Paul J. Winters; Brian D. Ogonowsky

[57] ABSTRACT

An optical disk player is provided, which includes a drive chassis provided with: a spindle motor for driving a turntable on which an optical disk is supported; a photopickup with a rack which is movable while being guided in the direction of approaching/separating with respect to the turntable; and a feed motor for applying a driving force to the rack. The rack is disposed on an operating line crossing the spindle motor, and an end portion of the rack is positioned within the area of a corner portion of a quadrilateral circumscribed in the outer circumference of the optical disk when the photopickup is moved to a position remotest from the turntable, thus, no hindrance is created by the thus projected portion of the rack because that area is a dead space of the player.

5 Claims, 2 Drawing Sheets

OPTICAL PICKUP FEED UNIT OF OPTICAL DISK PLAYER

BACKGROUND OF THE INVENTION

1. Field of the Invention

This invention relates to an optical disk player such as a compact disk player and, more particularly, to an optical pickup feed unit of the type in which an optical pickup facing opposite an optical disk is moved together with a rack by the motive force of a motor.

2. Description of the Prior Art

FIG. 3 is a plan view showing an optical pickup feed unit of a conventional compact disk player.

Reference numeral 1 designates a drive chassis. On the underside of this drive chassis 1 is provided a spindle motor 2. This spindle motor 2 is used to drive a turntable 3 disposed on the upper side of the chassis, by the driving force of this motor an optical disk D (not shown) placed on the turntable 3 is driven to rotate. Inside a cutout (not shown) formed in the drive chassis 1 is provided an optical pickup 5 having an objective lens 4 facing opposite the optical disk D, which is movable in the directions of X and Y. One side face 5a of the optical pickup 5 has a rack 6 secured thereto which is movable on the underside of the drive chassis 1. On the underside of the drive chassis 1 is further provided a feed motor 7. A rotary shaft 7a projecting from this feed motor 7 has a worm 8 secured thereto. The turning force of the feed motor 7 is transmitted from the worm 8 via a gear group (not shown) including reduction gears and a pinion to the rack 6, so that the photopickup 5 is driven together with the rack 6 in the directions of X and Y. In response to driving of the photopickup 5, a detecting beam spot emitted from the objective lens 4 scans the recording tracks of the optical disk D to read the record of the optical disk D.

According to the foregoing structure of the prior art, the rack 6 needs a certain length to cause the photopickup 5 to move within the extent of the radius of the optical disk D. In this connection, since the rack 6 has the same height as that of the spindle motor 2 on the underside of the drive chassis 1, the movable space of the rack 6 must be laid out in an area devoid of the spindle motor 2. In view of the above, as shown in FIG. 3, the movable space of the right-hand end 6a in the drawing of the rack 6 was laid out adjacent to one side of the spindle motor 2 in the prior art. Thus, the spindle motor 2 and the feed motor 7 are disposed with leaving a spacing therebetween to permit passage of the right-hand end 6a of the rack 6, and the width dimension Wa of the drive chassis 1 is made large by the extent of the movable space of the right-hand end 6a of the rack 6.

On the other hand, if the rack 6 is disposed on an operating line crossing the spindle motor 2 as shown in FIG. 4, it is possible to make narrow the spacing between the spindle motor 2 and the feed motor 7 to thereby shorten the width dimension Wa of the drive chassis 1. In this case, however, when the optical pickup 5 is driven in the direction of X and moved up to a position remotest from the turntable 3, the left-hand end 6b of the rack 6 projects from the drive chassis 1. Such projection of the left-hand end 6b of the rack 6 becomes an hindrance in designing the body of the optical disk player in which the drive chassis 1 is assembled.

SUMMARY OF THE INVENTION

It is an object of the present invention to provide an otpical pickup feed unit of the structure in which the spacing between a spindle motor and a feed motor is made narrow, and an end portion of a rack which projects when an optical pickup is moved to a position remote from a turntable does not act as a hindrance in designing a player body, whereby a reduction in width dimension of a drive chassis can be utilized as an advantage.

In brief, the present invention resides in an optical disk player including a drive chassis provided with: a spindle motor for driving a turntable on which an optical disk is supported; a photopickup with a rack which is movable while being guided in the direction of approaching/separating with respect to the turntable; and a feed motor for appying a driving force to the rack, characterized in that the rack is disposed on an operating line crossing the spindle motor, and an end portion of the rack is positioned within the area of a corner portion of a square circumscribing the outer circumference of the optical disk when the optical pickup is moved to a position remotest from the turntable.

According to the present invention, the rack is disposed on the operating line crossing the spindle motor to make the width dimension of the drive chassis as small as possible. Further, the end portion of the rack is made so as to project into the area of the corner portion of the square circumscribing the outer circumference of the disk, i.e. into a dead space of the player body, when the optical pickup is moved up to the position remotest from the turntable, whereby no hindrance is caused in designing the player body by the thus projected portion of the rack.

DESCRIPTION OF THE PREFERRED EMBODIMENT

Figure 1:
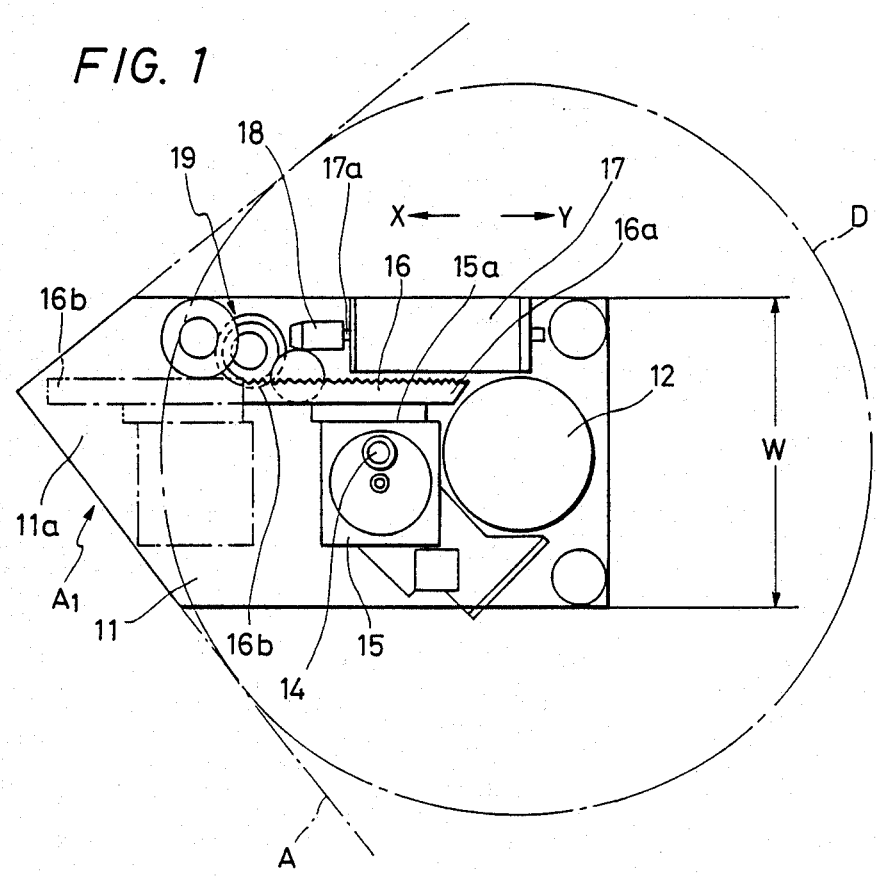
FIG. 1 is a plan view showing an optical pickup feed unit according to the present invention in an optical disk player.
Figure 2:
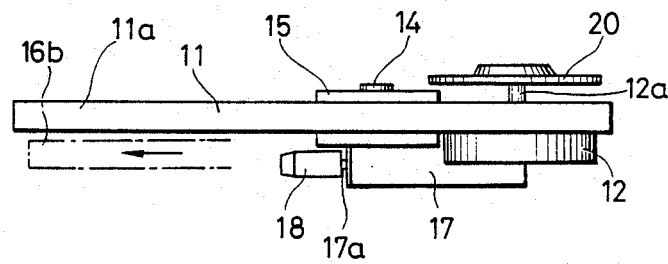
FIG. 2 is a side view of the unit shown in FIG. 1.
Figure 3:
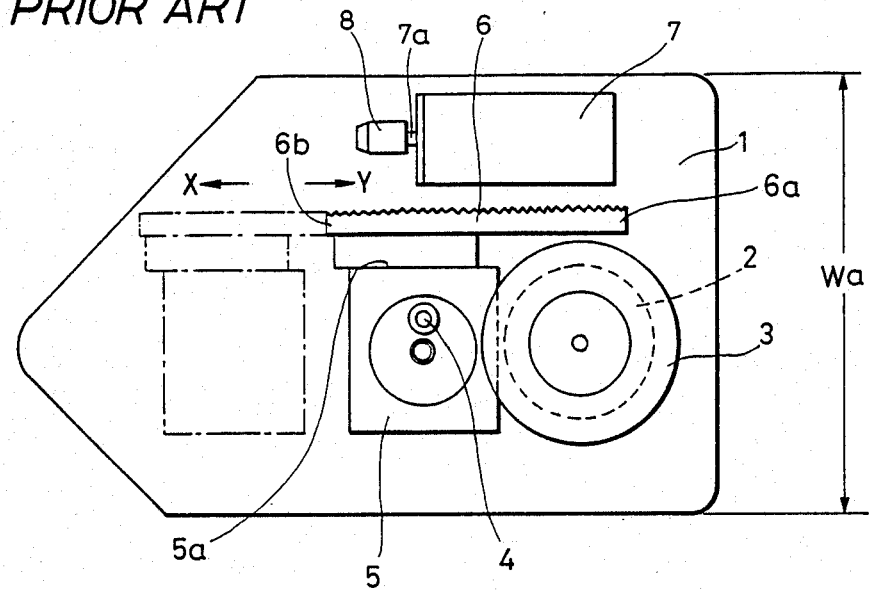
FIG. 3 is a plan view showing a conventional photopickup feed unit.
Figure 4:
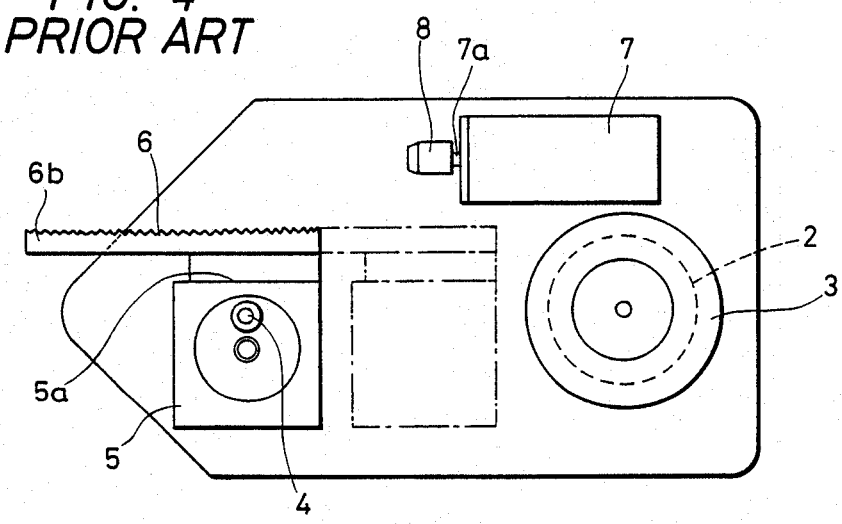
FIG. 4 is a plan view showing another conventional photopickup feed unit, which is explanatory of the problems of the prior art.

An embodiment of the present invention will now be described with reference to FIGS. 1 and 2.

In these drawings, reference numeral 11 designates a drive chassis of a disk drive unit of a compact disk player. This drive chassis 11 is accommodated in a casing A of a player body. This embodiment is configured so that a point portion 11a (a left-hand portion in the drawing) of the drive chassis 11 is rectangular in plan view and this rectangular portion coincides substantially with a corner portion of a square circumscribing the outer circumference of an optical disk D, whereby side dimensions of said square equal the diameter of optical disk D. Further, the point portion 11a is made to locate within a dead space $A_1$ of the corner portion inside the casing A of the player body.

On the underside of the drive chassis 11 is provided a spindle motor 12. A shaft 12a of this spindle motor 12 projects on the upper side of the drive chassis 11, and to the point of this shaft 12a is secured a turntable 20. On the turntable 20 is placed the optical disk D, which is driven to rotate by the motive force of the spindle motor 12. Further, the drive chassis 11 is provided with a optical pickup 15 having an objective lens 14 facing opposite the optical disk D, the optical pickup being movable in the directions of X and Y.

One side face 15a of the optical pickup 15 has a rack 16 secured thereto. This rack 16 is provided on the underside of the drive chassis 11 and disposed on an operating line crossing the spindle motor 12 also provided on the underside of the chassis. Further, the rack 16 has a length sufficient for the optical pickup 15 to move substantially over the whole extent of the radius of the optical disk D. Consequently, as the optical pickup 15 moves up to a position remotest from the turntable 12, the left-hand end 16b of the rack 16 projects leftward in the drawing, but this projecting position is set so as to be confined within the corner portion of the square circumscribing the outer circumference of the optical disk D. Further, the point portion 11a of the drive chassis 11 is formed at such a position that the lefthand end 16b of the rack 16 having moved up to the leftmost end does not project from the rectangular corner portion of the chassis.

Further, on the underside of the drive chassis 11 is disposed a feed motor 17 adjacent to the spindle motor 12. A rotary shaft 17a projecting from this feed motor 17 has a worm 18 secured thereto. Reference numeral 19 designates a gear group including reduction gears and a pinion. The turning force of the feed motor 17 is transmitted from the worm 18 via the gear group 19 to the rack 16 to drive the optical pickup 15 in the directions of X and Y. In response to driving of the optical pickup 15, a detecting beam spot emitted from the objective lens 14 scans the recording tracks of the optical disk D to read the record of the optical disk D.

As described above, since the rack 16 is disposed on the operating line crossing the spindle motor 12, when the optical pickup 15 has moved to the position remotest from the turntable 20 in the read-out operation as above, the left-hand end 16b projects into the point portion 11a of the drive chassis 11. That is, the left-hand end 16b projects into the dead space $A_1$ of the player body. Because this dead space $A_1$ does not have in particular any parts disposed therein up to now, the rack 16 thus projected, as indicated by the one-dot chain line, does not cause any hindrance to the operation of the player and the like.

According to the present invention, the following effects are produced:

(1) Since the rack secured to the optical pickup is disposed on the operating line crossing the spindle motor, there is no need of leaving between the spindle motor and the feed motor a space where the rack is driven, whereby the width dimension of the drive chassis can be made minimum; and (2) The end portion of the rack is located within the area of the corner portion of a square circumscribing the outer circumference of the optical disk D when the optical pickup has moved to the position remotest from the turntable, and the area of this corner portion acts as a dead space from the view point of designing the disk player body, thus, the projection of the rack into this space portion does not cause any hindrance to the function of the player. Further, since it is impossible to make the casing of the player body smaller than a square circumscribing the outer circumference of the disk, the use of the area of the aforementioned corner portion as the movable space of the rack does not give any influence to miniaturization of the player body.

What is claimed is:

1. In an optical disk player including a drive chassis provided with: a spindle motor for driving a turntable on which an optical disk is supported; an optical pickup with a rack which is movable while being guided in the direction of approaching/separating with respect to said turntable; and a feed motor for applying a driving force to said rack, an optical pickup feed unit characterized in that said rack is disposed on an operating line crossing said spindle motor, and an end portion of said rack is positioned completely inside the area of a corner portion of a square circumscribing the outer circumference of the optical disk, whereby side dimensions of said square equal the diameter of said optical disk, when said optical pickup is moved to a position remotest from said turntable.

2. An optical pickup feed unit according to claim 1, wherein the area of said corner portion is a dead space of the optical disk player.

3. An optical pickup feed unit according to claim 1, wherein said rack has a length sufficient for said optical pickup to move substantially over the whole extent of the radius of the optical disk.

4. An optical pickup feed unit according to claim 1, wherein said spindle motor and said feed motor are located proximate to one another and said rack, at its closest position to said turntable, does not interpose between said spindle motor and said feed motor.

5. An optical pickup feed unit according to claim 1, wherein said square circumscribing the outer circumference of the optical disk substantially corresponds to the boundaries of a casing for said optical disk player.

* * * * *